(12) United States Patent
Caelen

(10) Patent No.: US 11,110,877 B2
(45) Date of Patent: Sep. 7, 2021

(54) AMUSEMENT DEVICE SEAT ASSEMBLY INCLUDING LEG LOCKING DEVICE

(71) Applicant: VEKOMA RIDES ENGINEERING B.V., Vlodrop (NL)

(72) Inventor: Eloy Jacobus Antonius Gerardus Caelen, Grevenbicht (NL)

(73) Assignee: VEKOMA RIDES ENGINEERING B.V., Vlodrop (NL)

( * ) Notice: Subject to any disclaimer, the term of this patent is extended or adjusted under 35 U.S.C. 154(b) by 136 days.

(21) Appl. No.: 16/614,186

(22) PCT Filed: May 16, 2018

(86) PCT No.: PCT/NL2018/050325
§ 371 (c)(1),
(2) Date: Nov. 15, 2019

(87) PCT Pub. No.: WO2018/212653
PCT Pub. Date: Nov. 22, 2018

(65) Prior Publication Data
US 2021/0245694 A1 Aug. 12, 2021

(30) Foreign Application Priority Data
May 17, 2017 (NL) ..................................... 2018934

(51) Int. Cl.
*B60R 21/02* (2006.01)
*A63G 21/20* (2006.01)
*B60R 21/00* (2006.01)

(52) U.S. Cl.
CPC .............. *B60R 21/02* (2013.01); *A63G 21/20* (2013.01); *B60R 2021/0053* (2013.01); *B60R 2021/0097* (2013.01); *B60R 2021/022* (2013.01)

(58) Field of Classification Search
CPC . B60R 21/00; B60R 21/02; B60R 2021/0053; B60R 2021/0097;
(Continued)

(56) References Cited

U.S. PATENT DOCUMENTS

| | | | |
|---|---|---|---|
| 2,977,135 A * | 3/1961 | Graham | .................. B60R 21/02 280/751 |
| 7,204,559 B2 * | 4/2007 | Berra | ..................... B60R 21/02 297/466 |

(Continued)

FOREIGN PATENT DOCUMENTS

| | | |
|---|---|---|
| CN | 105396291 A | 3/2016 |
| EP | 0 958 013 B1 | 3/2002 |

(Continued)

OTHER PUBLICATIONS

Dutch Search Report issued in Priority Application No. 2018934, dated Jan. 31, 2018.

(Continued)

*Primary Examiner* — Jason C Smith
(74) *Attorney, Agent, or Firm* — Birch, Stewart, Kolasch & Birch, LLP

(57) ABSTRACT

An amusement device seat assembly includes a seat to allow a passenger to sit. A leg space is provided under a seat base for holding a left and right leg of the passenger. The seat assembly includes a leg locking device for retaining an in the leg space introduced lower leg of the passenger. The leg locking device includes a central mount for preventing a laterally inwardly directed movement of a leg. A lateral mount prevents a forwardly directed movement of the lower leg. A bracket which may be operable by the passenger himself is movable to provide an open or closed configuration of the leg locking device. In the closed configuration, an outer bracket extension prevents a laterally outwardly directed movement of a leg of a passenger. Advantageously, (Continued)

an intuitively working leg locking device is provided which contributes to a high level of operational reliability.

20 Claims, 6 Drawing Sheets

(58) Field of Classification Search
CPC .. B60R 2021/022; A63G 21/00; A63G 21/20; A63G 7/00
See application file for complete search history.

(56) References Cited

U.S. PATENT DOCUMENTS

| | | | | |
|---|---|---|---|---|
| 7,677,671 | B2* | 3/2010 | Steininger | A63G 7/00 |
| | | | | 297/488 |
| 9,044,369 | B2* | 6/2015 | Goldish | A61G 5/1051 |
| 9,737,448 | B2* | 8/2017 | Farmer | A61G 5/1035 |
| 10,525,924 | B2* | 1/2020 | Abe | B60R 21/233 |
| 10,646,387 | B2* | 5/2020 | Sasai | A61G 5/10 |
| 2002/0070599 | A1* | 6/2002 | Berra | A63G 7/00 |
| | | | | 297/466 |
| 2008/0157508 | A1* | 7/2008 | Kato | B60R 21/045 |
| | | | | 280/730.1 |
| 2008/0179937 | A1* | 7/2008 | Steininger | B60R 21/02 |
| | | | | 297/486 |
| 2010/0236444 | A1* | 9/2010 | Blonk | A63G 7/00 |
| | | | | 104/53 |
| 2018/0065593 | A1* | 3/2018 | Kovac | B60R 21/12 |
| 2018/0345899 | A1* | 12/2018 | Munsee | B60R 21/239 |
| 2019/0061667 | A1* | 2/2019 | Abe | B60R 21/206 |
| 2019/0254917 | A1* | 8/2019 | Rodriguez-Cruz | A61G 5/10 |

FOREIGN PATENT DOCUMENTS

| | | |
|---|---|---|
| EP | 1 215 091 B1 | 2/2006 |
| FR | 3 023 160 A1 | 1/2016 |

OTHER PUBLICATIONS

International Search Report (PCT/ISA/210) issued in PCT/NL2018/050325, dated Sep. 27, 2018.
Written Opinion of the International Searching Authority (PCT/ISA/237) issued in PCT/NL2018/050325, dated Sep. 27, 2018.

* cited by examiner

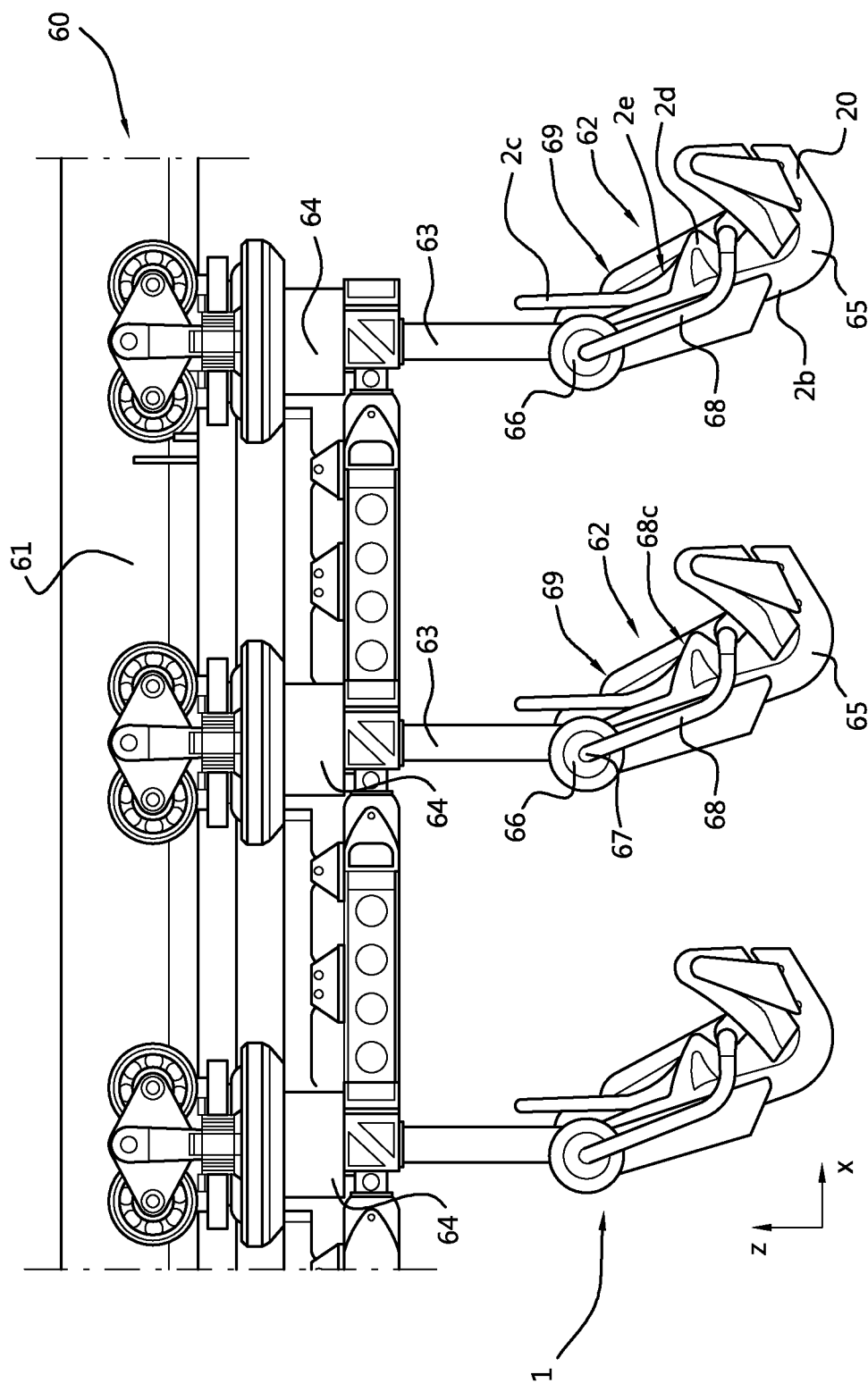

AMUSEMENT DEVICE SEAT ASSEMBLY INCLUDING LEG LOCKING DEVICE

The present invention relates to an amusement device seat assembly comprising a seat which has a seat base providing a seating surface at an upper side to allow a passenger to sit on the seat. The seat has a leg space under the seat base for holding a left and right lower leg of the passenger. Further, the amusement device seat assembly comprises a locking device for locking an in the leg space introduced lower leg of the passenger. The locking device has an open configuration to provide an initial opening for receiving the lower leg of the passenger and a closed configuration for retaining an in the leg space introduced lower leg. The locking device comprises a central mount. The central mount is centrally positioned under the seat base and divides the leg space into a left and right leg subspace for respectively receiving a left and right lower leg of the passenger. The central mount comprises a main mount to prevent a laterally inwardly directed movement of the leg.

In particular, the invention relates to an amusement device including such seat assemblies in which the amusement device is a rollercoaster in particular a rollercoaster including suspended seat assemblies.

Further, the invention relates to a locking device for locking an in a leg space of a seat introduced lower leg of a person and a method for operating such a leg locking device.

Amusement devices having seat assemblies for passengers are well known from the art and applied in many amusement devices such as roller coasters, both in fairgrounds and in amusement parks.

EP0958013B1 in the name of the applicant discloses an amusement device comprising a guide structure forming a track along which a vehicle capable of accommodating at least one passenger can travel. The passenger present in the vehicle during operation extends substantially in parallel with the track. The vehicle comprises a seat assembly with a seat arranged as a saddle. The seat has a seat base which provides a seating surface. A leg space is provided below the seat base. The seat assembly comprises an upper body retainer for retaining an upper body of the passenger and a leg locking device for locking a leg in the leg space. The leg locking device includes a leg support which is pivotable about a longitudinal axis at an end of a framework to enclose a leg.

An example of a seat assembly for an amusement device is disclosed in EP1.215.091B1. The seat assembly is arranged for transporting passengers on a seat. Each seat has a seat base on which an individual passenger can take a sit. A leg space for receiving the lower legs of a passenger is provided at an underside of the seat base. Downwards extending lateral portions and a centrally positioned support are provided at an underside of the seat base for laterally retaining the legs of the passenger. The central support and a left respectively right sided lateral portion form a respectively left and right leg subspace in the leg space. The central support and lateral portions are rigid. The seat assembly comprises a leg locking device for locking received lower legs of a passenger in respectively the left and right leg subspace.

The leg locking device comprises two flaps. The flaps are pivotally mounted at a front end of the central support and are rotatable about a substantially vertical axis. The locking device has an open configuration for receiving a lower leg through an initial opening into the leg subspace. Seen in a frontal view of the seat, in the open configuration, the flaps are rotated in a forward direction away from the seat to provide the initial opening to allow a lower leg to pass into the leg subspace. The device for locking the legs has a closed configuration in which the legs are locked behind the flaps. In the closed configuration, the flaps are rotated sidewards to close the initial provided opening.

A problem to this disclosed device for locking the legs is that the device can be operated to move the flaps to the closed configuration, while the legs of the passenger are not locked in. This provides an undesired situation. A closed locking device may be detected, but in reality the legs of the passenger are still free to move. In particular, when a tall person takes a sit, the lower legs of the person may extend too far in a forward direction which allows the flaps to rotate behind these lower legs, such that the legs are not captured in the leg subspace.

Another problem to this disclosed device is that the flaps may be uncomfortably pressing to the lower legs of a passenger during a ride. But also in advance of a ride, the flaps may uncomfortably press onto the lower legs to force the lower legs into a predetermined position.

The general object of the present invention is to at least partially eliminate the above mentioned drawbacks and/or to provide a useable alternative. More specific, it is an object of the invention to provide a seat assembly for an amusement device including a leg locking device having an increased operational reliability and ride comfort.

According to the invention, this object is achieved by amusement device seat assembly according to claim 1.

According to the invention an amusement device seat assembly is provided. The seat assembly comprises a seat. The seat has a seat base for a allowing a passenger to sit. Preferably, the seat further has a back support for supporting a back of a passenger in the seat.

During a ride of the amusement device, the seat assembly may obtain all kind of orientations, e.g. upside down or a far inclined position, to provide excitement to the passenger. The seat assembly may pitch, roll and yaw. Here, the arrangement of the seat is defined with reference to a common orientation of the seat assembly. The common orientation considers an initial posture of a passenger in advance of a rollercoaster ride i.e. before a launch, in which the passenger is sitting upright as on a chair or on a saddle of a bike. In the common orientation, the lower legs of the passenger are situated under the hips of the passenger. In the common orientation, a back support of the seat is positioned above the seat base. In the common orientation, a sagittal axis of the passenger corresponds with a forward direction and a frontal axis of the passenger corresponds with a lateral direction.

The seat base has a seating surface at an upper side. A leg space is provided under the seat base. The leg space is arranged for holding a left and right lower leg of a passenger. A leg space under the seat base means with reference to the common orientation that the legs of the passenger are situated lower than the seat base when the passenger is sitting on the seat base. When seen from a top view, the leg space may be situated right under the seat base e.g. in case that the seat base is embodied as a chair in which legs hang over a frontal edge of the seat base, but may also be situated in a lower region besides the seat base e.g. in case that a seat base is embodied as a saddle.

The seat has a locking device for locking an in the leg space introduced lower leg of a passenger, such that the lower legs are locked in position during a ride. The locking device has an open configuration for receiving a lower leg of a passenger through an initial opening and a closed configuration for retaining an in the leg space received lower leg.

The locking device comprises a central mount which is centrally positioned under the seat base, such that the central mount divides the leg space into a left and right leg subspace for respectively receiving a left and right lower leg of a passenger.

The central mount comprises a main mount. In considering the common orientation of the seat assembly, the main mount extends in a vertical plane, preferably corresponding with a sagittal plane of the passenger. The main mount is preferably panel shaped but may alternatively be bar shaped. Herewith, the main mount may form an obstruction to prevent an inwardly directed lateral movement of a lower leg.

The central mount further comprises a lateral mount, in particular a shin mount, which is arranged to prevent a forward movement of a leg. The lateral mount as a shin mount may be arranged for supporting a left or right shin of a lower leg of a passenger. The lateral mount is connected to the main mount. At each side, the main mount is provided with a lateral mount for enclosing respectively a left and right lower leg of a passenger. Each lateral mount extends in a lateral, substantially perpendicular, direction away from the main mount. In advance of a ride, when a passenger has just taken place in the seat, the lateral mount is stationary positioned before or behind respectively a shin or calf of a leg of the passenger. To get into a ride positon, the passenger has to place its lower leg behind the lateral mount such that the lateral mount blocks a forward movement of the lower leg.

The lateral mount is stationary with respect to the central mount. Stationary means that the lateral mount remains in that position and cannot be moved away. Stationary means that the lateral mount cannot be temporarily moved away from that lateral position, such that a leg of a passenger is always blocked in a movement along the main mount. In an embodiment, the lateral mount might be adaptable in orientation. The lateral mount might be rotated to another orientation, e.g. rotated about a horizontal axis in an upwards direction to align with a shin of a passenger, but still said lateral mount remains in its blocking position.

Viewed in a cross-section from above, the central mount is preferably T-shaped, in which the main mount forms the standing T-leg of the T-shape of the central mount. The lateral mount form the overlying T-leg of the T-shape of the central mount.

The locking device according to the invention further comprises a movable bracket for enclosing a lower leg of the passenger. The bracket is movable with respect to the lateral mount. The bracket is movable to and fro an open and closed position to provide respectively the open and closed configuration of the locking device. The bracket is cooperatively positioned opposite the lateral mount for enclosing a lower leg of a passenger in between the bracket and the lateral mount.

In the open configuration of the locking device the bracket is positioned at the open position in which the bracket is spaced from the lateral mount at a distance to provide an initial opening which is sufficiently large to let a leg pass into a leg subspace.

In the closed configuration of the locking device, the bracket is positioned at the closed position. In the closed position, the bracket is spaced from the lateral mount at a smaller distance than in the open position. In the closed position, the initial opening is reduced, such that a leg cannot exit the leg subspace. Particularly, the bracket has a receiving opening which is facing the lateral mount, such that a shin side of a lower leg of a passenger is positioned opposite a lateral mount, also called shin mount, and a calf side of a lower leg of a passenger is positioned opposite the bracket.

The bracket has a main bracket and an outer bracket extension. The main bracket is movably connected with respect to the seat, e.g. to the central mount or to a frame of the seat assembly, in particular to the seat base. The outer bracket extension is connected to the main bracket and situated at a lateral outside position with respect to the seat assembly to enclose an outside of a leg of passenger. Particularly, the bracket is L-shaped. In other words, the outer bracket extension is connected to the main bracket at an end of the main bracket opposite an end of the main bracket which is directed towards the central mount. The outer bracket extension extends in the closed position of the bracket from the main bracket in a direction towards the lateral mount.

In comparison with the prior art, the seat assembly according to the invention which includes a movable bracket to allow in the open position an introduction of the leg and to prevent an outwardly directed lateral movement of the leg in the closed position may provide several advantages.

The leg may be fully retained in between the main and lateral mount and the main bracket and outer bracket extension. When a passenger is sitting on the seat base and after placing his leg facing the lateral mount, the main mount is situated at an inner side of the leg, the main bracket may be situated behind the leg and the outer bracket extension is situated at an outer side aside the leg, such that the leg is fully enclosed. Herewith, the lower leg of the passenger is fully enclosed and retained by the locking device.

An advantage is that, the arrangement of the locking device may be more intuitive to the passenger and is inviting the passenger to place his legs in a correct position in the locking device of the seat assembly. The passenger will intuitively understand that his legs should be placed in engagement with or just behind the shin mounts or into a receiving opening of the bracket. The intuitive character of the locking device will reduce a risk in that a passenger ignores a locking of his legs. Advantageously, the leg locking device according to the invention increases an operational reliability.

The amusement device seat assembly according to the invention may improve a level of comfort to a passenger. Lower legs of a passenger are no longer forced into a predetermined position by front-positioned machine operated flaps.

According to the invention, a passenger can place his lower legs behind a lateral mount, and the bracket simply provides a lockage of the lower legs from behind when the bracket is moved into the closed position. The bracket may be operated and positioned after a placement of the lower leg behind the lateral mount. Advantageously, the bracket may be operated by the lower leg itself such that a lockage is provided simultaneously with positioning the lower legs behind the lateral mount.

According to the invention, the lateral mount, also called a shin plate, serves to support the lower legs during a ride, while the bracket serves to lock the lower leg. A technical function of supporting the lower leg is separately arranged from a technical function of locking the lower leg. As the lateral mount is situated in front, and generally cushioned, a passenger will intuitively understand the seat and place his lower legs against the provided support. Moving the bracket will provide the lockage of the lower legs. In contrast, in the prior art, shin plates are used to both support and lock a lower leg in position. Such prior art arrangements are less intuitive and more vulnerable to failure.

A further advantage is that a laterally directed initial opening for introducing a leg from aside allows a form of a shin mount which is designed so bulky that a passenger will have no tendency to pass his legs in front of the shin mount. This will reduce a risk in that a tall person stretches his legs past the locking device.

Additionally, in comparison with a backwardly directed introduction of the legs which occurs when an initial opening of a locking device is situated at a front, the lateral inwardly directed introduction of the legs will be carried out by the passenger more naturally. Due to some excitement before a ride a person will naturally tend to close his legs together instead of relax spreading his legs.

Another advantage of a laterally inwardly directed introduction of the legs is that the locking device may remain visible to a passenger while sitting in the seat assembly. When sitting in the seat assembly, the passenger may observe that his legs are not yet positioned and may correct this. Herewith, the operational reliability of the seat assembly is increased.

Additionally, the combination of the stationary shin mount in front of the shin of the leg and the bracket with outer bracket extension advantageously provides a secure arrangement to retain a forwardly and laterally outwardly directed movement of the leg.

In an embodiment of the seat assembly according to the invention, the bracket has an inner bracket extension which is connected to the main bracket. The bracket of the locking device has a U-shape. The inner and outer bracket extensions form a receiving opening of the bracket for receiving a lower leg of the passenger. The inner and outer bracket extensions form the freely extending U-legs of the U-shape and the main bracket forms the connection of the U-legs. In particular, the inner and outer bracket extensions have a substantially same length. In the closed position of the bracket, the inner and outer bracket extensions are directed towards the shin mount.

Advantageously, due to the inner bracket extension, a passenger is enabled to close the locking device himself by inwardly moving his lower leg into the leg space. By pushing onto the inner bracket extension, the passenger may move the bracket from the open position to the closed position for retaining the lower leg in the leg space. Advantageously, a driving component for moving the bracket from the open to the closed position may be unnecessary. A simple locking pin may suffice to lock the bracket in a closed position.

In an embodiment of the seat assembly according to the invention, the bracket is rotatably connected to the seat assembly, in particular to the underside of the seat base. The bracket is rotatable about a bracket pivot axis, such that the bracket is rotatable to and fro the open position and the closed position to obtain respectively the open and closed configuration of the locking device. Preferably, the bracket is pivotally connected to the seat base about a substantially normal axis of the seating surface, in particular a substantially vertically directed pivot axis.

Advantageously, a rotatable connection of the bracket to the seat assembly reduces a risk on any interference of the bracket when moving the bracket to and fro the open and closed position. Advantageously, a rotational arranged bracket may provide a compact configuration which reduces a required built-in space.

In an alternative embodiment of the seat assembly according to the invention, the bracket may be slidably connected to the seat assembly. A sliding movement of the bracket from the open to the closed position may transform the locking device from the open to the closed configuration. Herewith, the sliding movement may reduce an opening which initially allows an introduction of a passenger's leg.

In an embodiment of the seat assembly according to the invention, the receiving opening of the U-shape bracket is adapted to a width of a leg of a passenger. The inner bracket extension is adapted for engagement with an inner side of a leg of a passenger. The inner bracket extension is connected to the main bracket at an end opposite the outer bracket extension, such that the leg of the passenger is placeable in between the inner and outer bracket extension. The U-shape bracket is arranged to be inwardly rotatable to the closed position by a push on the inner bracket extension acted by the passenger. In particular, the bracket is outwardly biased, e.g. by a gas- or torsion-spring, such that a biasing force is acting on the bracket to move the bracket from the closed position to the open position. A passenger may counteract the biasing force by pressing is leg against the inner bracket extension to move the bracket from the open position to the closed position. Herewith, the passenger operates the locking device.

Advantageously, the inner bracket extension allows to operate the locking device from the open configuration to the closed configuration by a leg movement. When a passenger takes a seat, a leg of the passenger is laterally inwards introduced into a corresponding subspace and the leg will intuitively engage with the inner bracket extension. The inner bracket extension can be pushed by the leg of the passenger and will move together with the leg in an inwards direction. Herewith, the bracket of the locking device is operated by the movement of the leg of the passenger.

In an embodiment of the seat assembly according to the invention, the bracket is snapped into the closed position. In the closed position, the bracket is connected by a snap-connection to the seat assembly. The snap-connection comprises a snap-member to provide a snap engagement to the seat assembly, in particular to the seat base. The snap-connection may be sufficient strong to retain a lateral movement of the leg of the passenger. The snap-connection may serve as a lockage. Advantageously, the snap-connection may provide a clear indication to the passenger that the bracket is closed in a correct position. An auxiliary bracket lockage may be provided to lock a snapped bracket.

In an embodiment of the seat assembly according to the invention, the leg locking device comprises a bracket lockage which only locks a left and right positioned bracket when both brackets are moved in the closed position. This provides an advantage in preventing a falling of a passenger when leaving the seat while only one leg has already been introduced into the leg space.

Preferably, the snap-connection of the bracket in the closed position is provided with an actuable blocking to prevent an unauthorised release. The blocking includes a blocking actuator, e.g. a solenoid, and a locker, e.g. a pin. The blocking is actuable by an operator or electronically by a control unit to release the snap-connection and to release the bracket from the closed position. Herewith, an operator or the control unit can be authorised to release a passenger from the seat assembly.

In an embodiment of the seat assembly according to the invention, the central mount is solid. The lateral mount is fixed to the main mount. Solid means that the central mount does not have any movable components. Particularly, the central and lateral mount are a one piece item, e.g. obtained by moulding or welding. Advantageously, the central mount may be integral with a frame of the seat assembly.

In a preferred embodiment of the seat assembly according to the invention, the lateral mount is movable connected to the central mount. Movable connected means that the lateral mount remains in position with respect to the central mount, but the lateral mount may obtain another orientation with respect to the central mount. The lateral mount is preferably movable into an orientation which corresponds with an orientation of a received lower leg. Advantageously, the lateral mount arranged as a shin mount can be aligned with an in the leg space introduced lower leg which advantageously contributes to an improved comfort to the passenger.

In an embodiment of the seat assembly according to the invention, the lateral mount is pivotally connected to the main mount about a mount axis. The lateral mount is rotatable connected to the main mount about the mount axis which transversally extends in a direction away from the main mount. Preferably, the mount axis is laterally, substantial horizontally, directed. In the common orientation, the mount axis extends in a substantially horizontal direction.

In a particular embodiment in which the lateral mount is arranged as a shin mount, the shin mount has a shin mounting surface which in use faces a shin of a leg of a passenger. The shin mount is rotatable about a shin mount axis to obtain an orientation of the shin mounting surface which corresponds with an orientation of a received leg. Advantageously, the rotatable shin mount is adaptive to a change in an orientation of the leg during a ride or adaptive for different passengers.

In an embodiment of the seat assembly according to the invention, the shin mounting surface comprises a shin pad. The shin pad includes a soft material, like a foam material, to provide a soft shin mounting surface which is comfortable to a passenger when a shin of the leg is in contact with the shin mount.

In an embodiment of the seat assembly according to the invention, the seat assembly further comprises an upper body retainer for retaining an upper body of a passenger. Advantageously, a seat assembly comprising both an upper body retainer and a locking device for locking a leg of a passenger may provide a full body retainer at the seat assembly.

In a particular embodiment of the upper body retainer, the upper body retainer comprises a bar construction including a lap bar to retain a movement of a hip of the person. The lap bar is connected to the seat assembly by pivot arms. The bar construction is rotatable about a pivot axis, preferably extending behind a back support of the seat to move the bar construction to and fro an open and closed position which respectively corresponds with an open and closed configuration of the upper body retainer. Preferably, the bar construction is actuable by a bar construction actuator. The bar construction actuator may be operatable connected to an accumulator to provide a stand-alone operating unit at the seat assembly. The bar construction actuator may be installed to move the bar construction from the open to be closed position, wherein a locking member is provided to lock the bar construction in the closed position. An operator or a control unit may be authorised to unlock the bar construction to let a passenger out of the seat assembly.

In a particular embodiment of the upper body retainer, the upper body retainer comprises a harness to retain a movement of the upper body of the person. The harness is arranged to engage the upper body at a breast level. In particular, the harness may be connected to the bar construction.

In an embodiment of the seat assembly according to the invention, the seat assembly further comprises a control unit which is programmed to operate both the upper body retainer and the locking device for locking a leg the passenger, which may also be called a leg locking device or leg retainer. Preferably, the operation of the upper body retainer and the operation of the leg locking device are separate independent operations. Advantageously, if after a check by an operator appears that one of the upper body retainer or leg locking device needs to be re-operated, not both, but only one of the retainers need to be re-operated. The control unit is programmed to provide a proper locking of the upper body and leg locking device. Preferably, the control unit is programmed to first operate a release of the leg locking device and only after detecting a successful release operation of locking device then to successively operate a release of the upper body retainer. Advantageously, the leg locking device is in the open configuration before releasing the upper body retainer which may prevent a passenger from falling when trying to stand up. Releasing the upper body retainer before releasing the leg locking device might cause the passenger to fall when the passenger is too quick and is not aware that his lower legs are still retained.

Further, the invention relates to an amusement device, in particular a rollercoaster, comprising an amusement device seat assembly according to the invention. In particular, the amusement device comprises a rollercoaster vehicle embodied as a motorbike having a seat configured as a saddle. In particular, the amusement device comprises a rollercoaster vehicle, like a passenger car, comprising a chair shaped seat including a seat base and a back support.

Further, the invention relates to a leg locking device for locking a lower leg of a person. Further, the invention relates to a retainer device including a leg locking device according to the invention and an upper body retainer.

Further, the invention relates to a method for retaining a passenger in a seat assembly of an amusement device according to the invention.

Further, the invention relates to a method for operating a leg locking device for retaining a person in an amusement device seat assembly, wherein use is made of an amusement device seat assembly according to the invention comprising the step of operating the leg locking device from an open to a closed configuration by closing the bracket being situated behind the lateral mount and the step of operating the leg locking device from a closed configuration to an open configuration for releasing an in a leg space retained introduced lower leg of a person.

In an embodiment of the method according to the invention, the bracket is closed by a movement of a lower leg of the passenger, wherein the passenger pushes the bracket to the closed position.

In an embodiment of the method according to the invention, a left and right bracket of the leg locking device are only locked when both brackets are each moved to the closed position.

In an embodiment of the method according to the invention, the provided amusement device seat assembly further comprises an upper body retainer, wherein operational steps of releasing the upper body retainer and the leg locking device are successively carried out, the leg locking device being operated from the closed configuration to the open configuration before performing a release operation of the upper body retainer.

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

FIG. 1 shows a portion of an exemplary suspended rollercoaster in a side view, but in which the suspended rollercoaster has no leg locking device;

FIGS. 2A and 2B schematically show two embodiments of a leg locking device according to the invention which are respectively provided with a pivoting and sliding bracket behind a lateral mount;

FIG. 3 schematically shows a seat assembly including a locking device according to the invention;

Figure 5A:
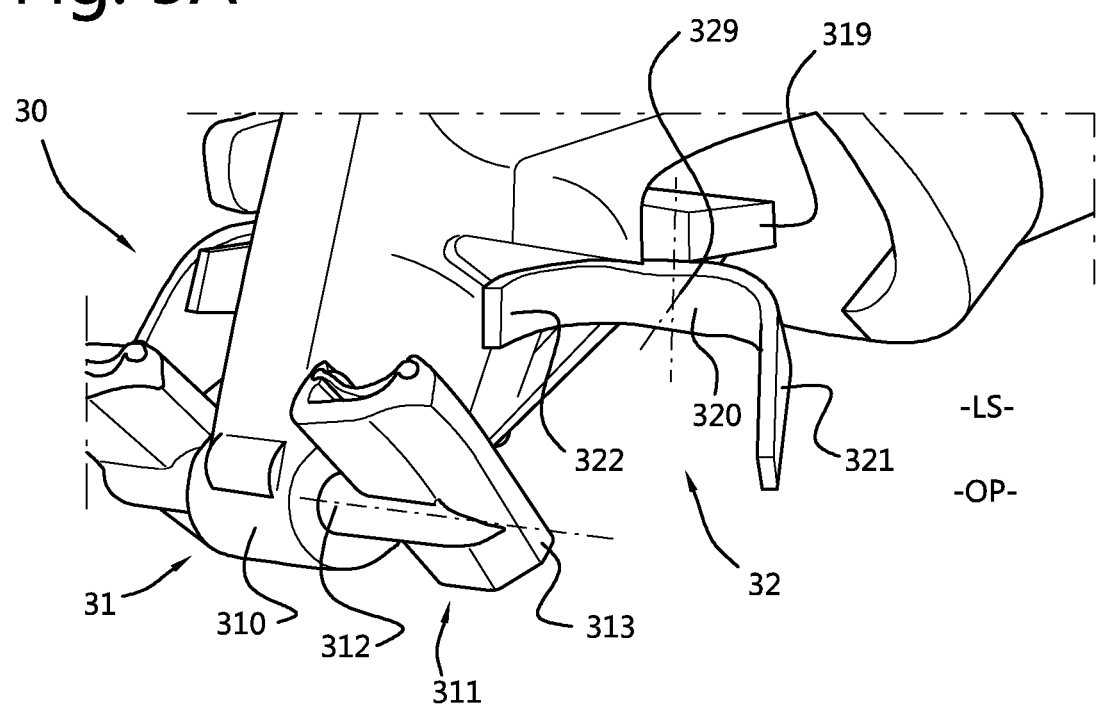
Figure 5B:
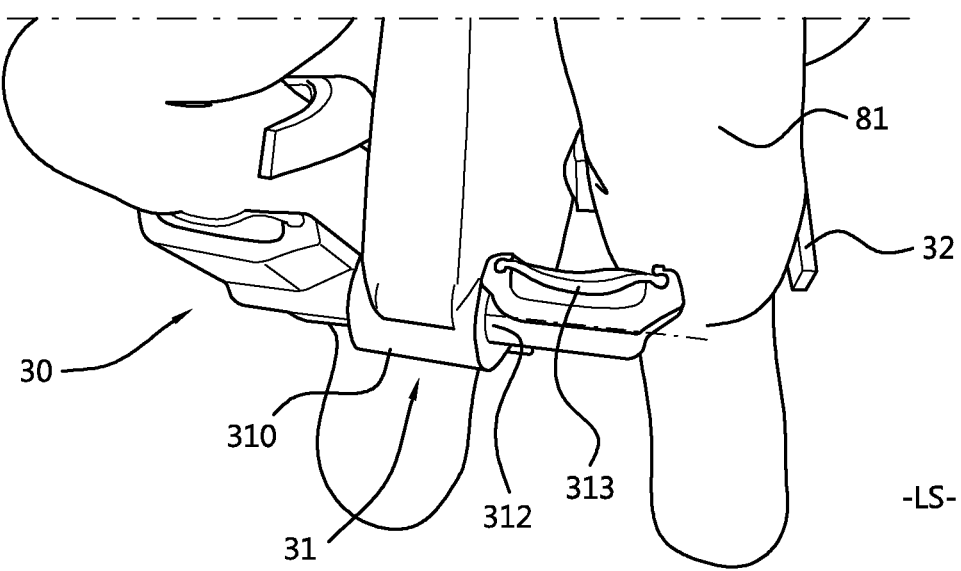
Figure 5C:
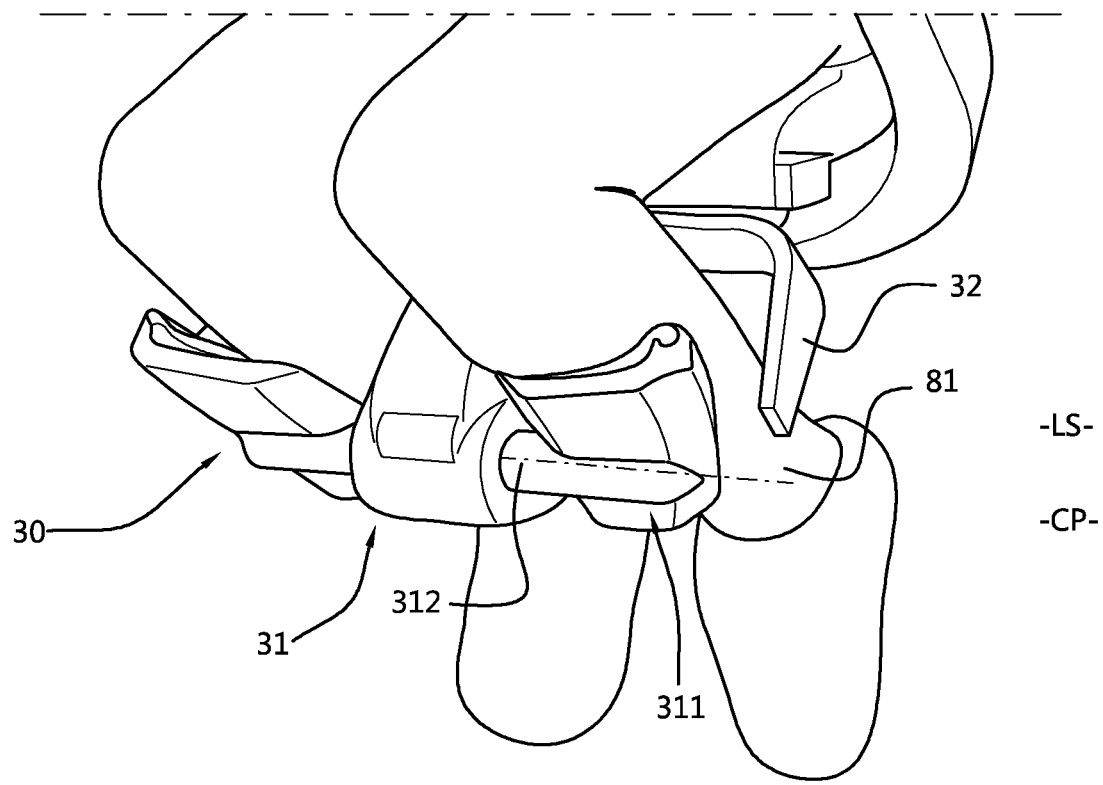

FIG. 5A schematically shows a locking device according to the invention in the open configuration;

FIG. 5B schematically shows the locking device of FIG. 5A, while a passenger introduces his leg into a bracket of the locking device; and FIG. 5C schematically shows the locking device of FIGS. 5A and 5B, in which the passenger has brought his legs together and in which the locking device has moved to the closed configuration.

Identical reference signs are used in the drawings to indicate identical or functionally similar components. To facilitate comprehension of the description and of the claims the words vertical, horizontal, longitudinal, cross-sectional—with reference to gravity and to the coordinate system X, Y, Z shown in the drawings—are used in a non-limiting way.

To provide some context of the technical field of the invention, FIG. 1 shows a portion of a suspended rollercoaster 60. The suspended rollercoaster 60 is an example of an amusement device as provided by the invention and comprises an elongated track 61 on which multiple amusement device seat assemblies 62 are movable.

Each seat assembly 62 supports at least one seat 65. Such a seat 65 is in further detail illustrated in FIGS. 4A and 4B and referred with reference number 2. The seat is capable of accommodating a passenger. The seat 65 comprises a seat base 20 providing a seating surface 2a for an individual passenger. The seating surface 2a is arranged to allow a person to sit on it. Here, the seating surface 2a has a shape adapted to the upper legs of the person such that the upper legs are well supported and thus positioned comfortably.

Further, the seat 65, 2 comprises a back support 2b providing a back support surface 2e. The back support surface 2e is the surface of the back support 2b against which the back of a person 8 rests when sitting in the amusement device seat assembly 1. The back support 2b may be provided with small curvatures to improve the comfort of the person 8.

Here, the seat 65, 2 further comprises a headrest 2c and a lumbar support 2d. In a preferred embodiment, the seat 2 is produced in one piece, for example by mould casting. The seat 2 may have an integral back support 2b, headrest 2c and lumbar support 2d. Preferably, the seat base 20 is separate from the back support 2b.

Each seat assembly 62 comprises a frame 63 including track engagement means 64. As is preferred, and common, each track engagement means 64 includes one or more sets of rollers that engage on the track 61. The seat 65 is connected to the frame 63.

The seat assembly 62 comprises an upper body retainer 69. The upper body retainer 69 forms an upper body locking device for locking an upper body 82 of a passenger in the seat 2.

Figure 4A:
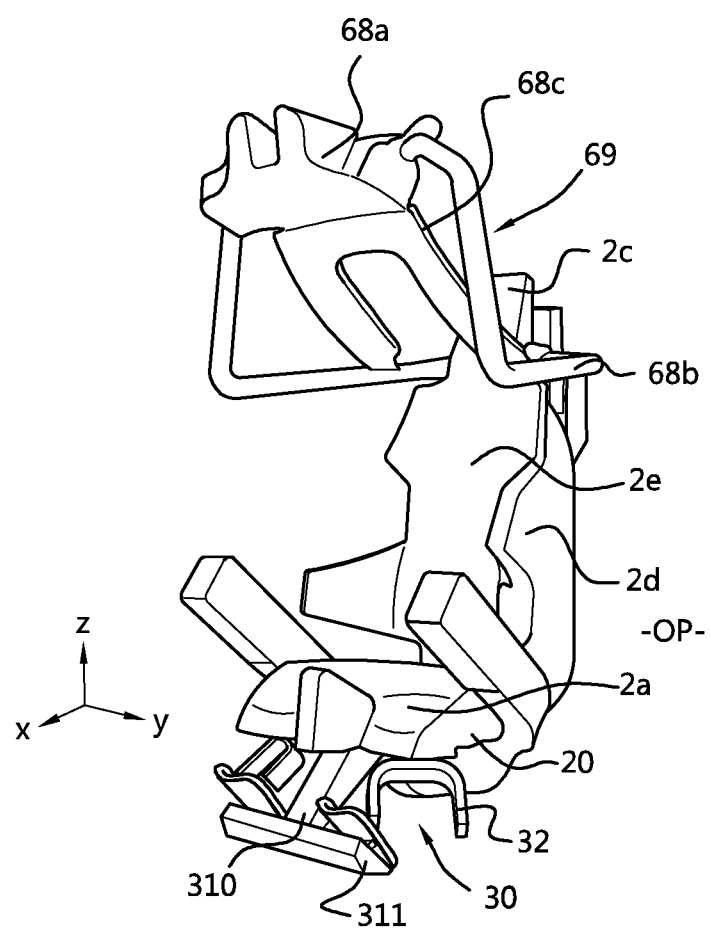
FIG. 4A shows in a perspective view a seat assembly including a locking device according to the invention in an open configuration.

As a further shown in FIG. 4A, the upper body retainer 69 includes a bar construction 68. Further, the upper body retainer 69 may comprise a belt construction and/or a body harness 68c to provide a further support to the upper body of the person sitting in the seat assembly 62. To increase compatibility, such a belt construction and/or body harness 68c may comprise a padded foam.

Figure 4B:
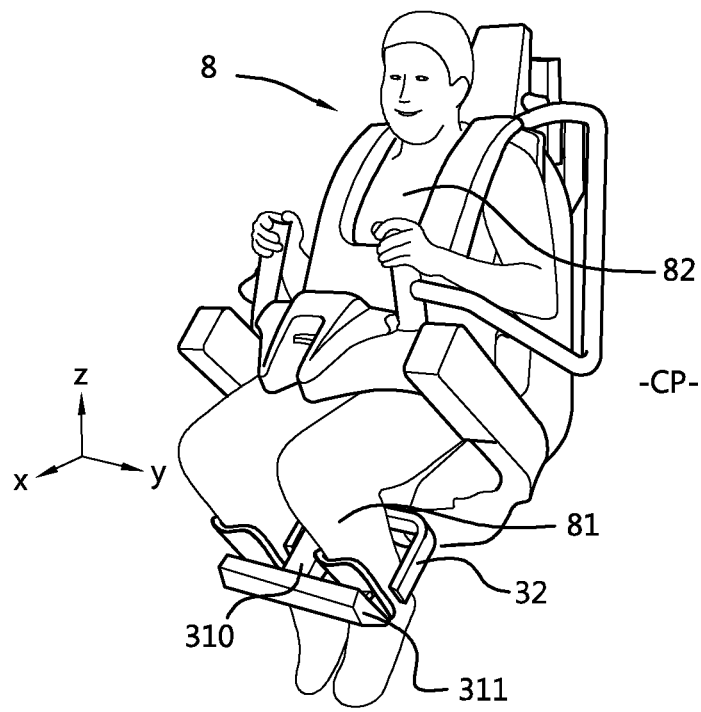
FIG. 4B shows in a perspective view a passenger sitting in the seat assembly as shown in FIG. 4A and having introduced his legs in the leg space enclosed by the locking device, which locking device is now in the closed configuration.

Here, the bar construction 68 comprises a lap bar 68a which is connected to two pivot arms 68b. The pivot arms 68b extends substantially perpendicular from a pivot axis 67 to the lap bar 68a. The pivot axis is positioned at the seat 2. The pivot axis 67 extends just behind the seat 2. The lap bar 68a extends substantially perpendicular from the pivot arms 68b and substantially parallel to the pivot axis 67. The frame 63 further comprises a pivot mechanism 66. The pivot mechanism 66 is operable by an actuator to move the lap bar 68a from a raised position in which the lap bar is raised from the seat 2—as shown in FIG. 4A- to allow a passenger to sit down in the amusement device seat assembly, to a lowered position—as shown in FIG. 4B. In the lowered position, the lap bar 68a is in the vicinity of a seat surface of the seat base 20, so as to extend over the lap of a passenger seated in the amusement device seat assembly 62. When lowered, the lap bar 68a is connected to a locking member to keep the lap bar 68a in the lowered position during a ride.

The actuator to operate the pivot mechanism 66 is preferably an hydraulic or pneumatic actuator. The actuator may be associated with an accumulator. Preferably, two actuators are provided symmetrically to act respectively at a left and right side of the bar construction 68. The pivot mechanism is upwardly biased, e.g. by a gas- or torsion-spring, such that a upwards force is acting on the pivot mechanism to move the bar construction from the closed position to the open position. A passenger may counteract the upwards force by pulling to move the bar construction from the open position to the closed position.

The prior art seat assembly 62 as shown in FIG. 1 is designed similar to what is shown in the following figures, but in FIG. 1, the seat assembly 62 lacks a leg locking device for locking a lower leg of a person to the seat assembly. The provision of a particular leg locking device 30 is a contribution of the invention.

FIG. 2 schematically show a some embodiments of the leg locking device 30 according to the invention. The locking device comprises a central mount 31. The central mount 31 is centrally positioned with respect to a seat assembly as indicated by the central line which extends from a back side B to a front side F of the seat assembly. The central mount 31 subdivides a leg space LS into a left and right subspace. The central mount 31 serves for mounting components of the seat assembly. The central mount 31 comprises a main mount 310. The main mount 310 may serve as a lateral leg stopper to prevent an inwardly directed lateral movement of a leg.

The central mount 31 further comprises a lateral mount 311. The lateral mount 311 is connected to the main mount 310. The lateral mount 311 extends in an outwards direction laterally away from the main mount 310. The lateral mount 311 serves as a front stopper to prevent a forward movement of a leg. Stationary means here that despite a possible pivotal connection to allow a change in orientation, the lateral mount 311 remains in position to serve as a front stopper.

Figure 2A:
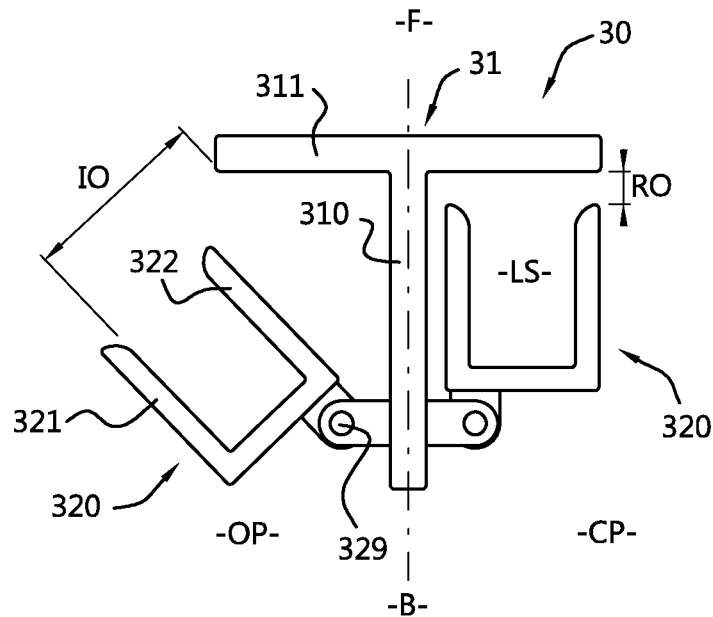
Figure 2B:
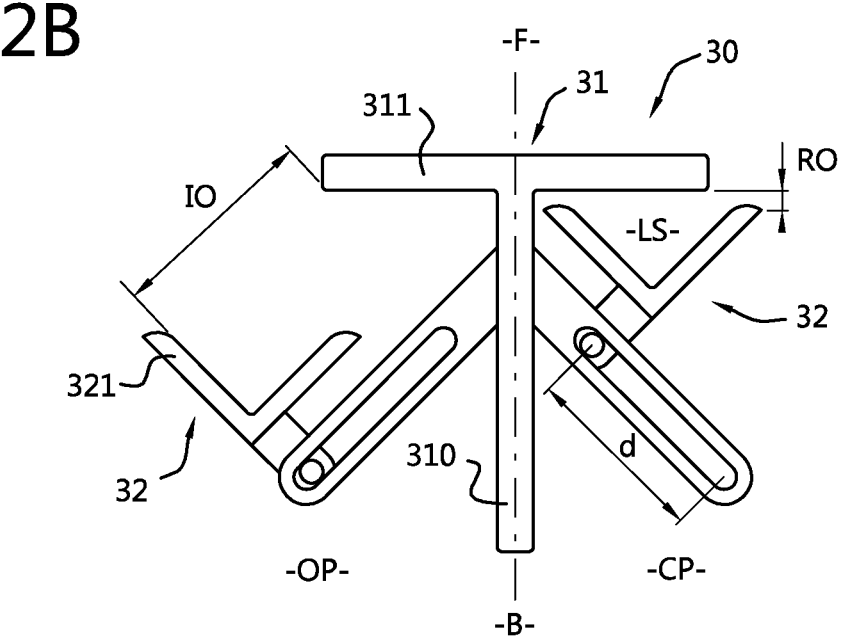

FIGS. 2A and 2B show several embodiments of the leg locking device 30 according to the invention.

In FIGS. 2A and 2B, the lateral mount 311 is arranged as a shin mount. The shin mount is positioned at a front side F of the leg space LS. The shin mount prevents a forward movement of a leg of a passenger.

Further, the locking device 30 comprises a bracket 32. The bracket 32 is arranged to prevent a laterally outwardly directed movement of a leg. Bracket 32 comprises a main bracket 320 which forms a bracket body for connecting the bracket to the central mount 31 of the seat assembly. The main bracket 320 is movable connected to the central mount 31 of the seat assembly for releasing and enclosing a leg of a passenger. The bracket 32 is movable to and fro an open OP and closed position CP. The open position OP is illustrated in a left view of the drawing and the closed position CP is illustrated in a right view of the drawing. In the open position OP of the bracket, the open configuration of the leg locking device 30 is provided. In the closed position CP of the bracket, the closed configuration of the leg locking device is provided.

As shown in FIG. 2A, the bracket 32 may be rotatably movable to and fro the open OP and closed position CP. As shown in FIG. 2B, the bracket 32 may be displacable between two end positions, e.g. by sliding. In particular, the bracket 32 is linearly movable to and fro the open OP and closed position CP over a lock distance D. The bracket 32 may be guided by a linear guide. The bracket 32 may be connected by the linear guide to the central mount 31.

The lateral mount 311 and the bracket 32 together form a leg lockage to prevent a forward, backward and lateral outwardly movement of the leg.

In FIGS. 2A and 2B, the bracket is positioned cooperatively with the lateral mount 311 to allow the bracket 32 to engage to a back sided region of a lower leg, like a knee bend, a calf or a heel. The lateral mount 311 is positioned at a front side F of the leg locking device 30 and the bracket 32 is positioned at a back side B of the leg locking device 30. Seen from the front side F, the bracket 32 is positioned behind the lateral mount 311, such that the bracket 32 prevents a backwardly directed movement of a leg.

The bracket 32 comprises an outer bracket extension 321. The outer bracket extension 321 is connected to the main bracket 320. The outer bracket extension 321 is positioned at an outer end of the main bracket 320. Herewith, the outer bracket extension is positioned at a lateral outside position of the bracket 32.

In the open position OP of the bracket, the outer bracket extension 321 is spaced from the lateral mount 311 to provide an initial opening 10 to allow an introduction of the leg into the leg subspace. In moving the bracket to the closed position CP, the outer bracket extension 321 is placed in a proximity or adjacent to the lateral mount 311, such that the initial opening is reduced to a reduced opening RO. In the closed position CP, the outer bracket extension 321 prevents a lateral outwardly directed movement of an introduced lower leg.

In the following figures, the leg locking device 30 according to the invention is illustrated in further detail in an amusement seat assembly which is indicated by reference number 1.

Figure 3:
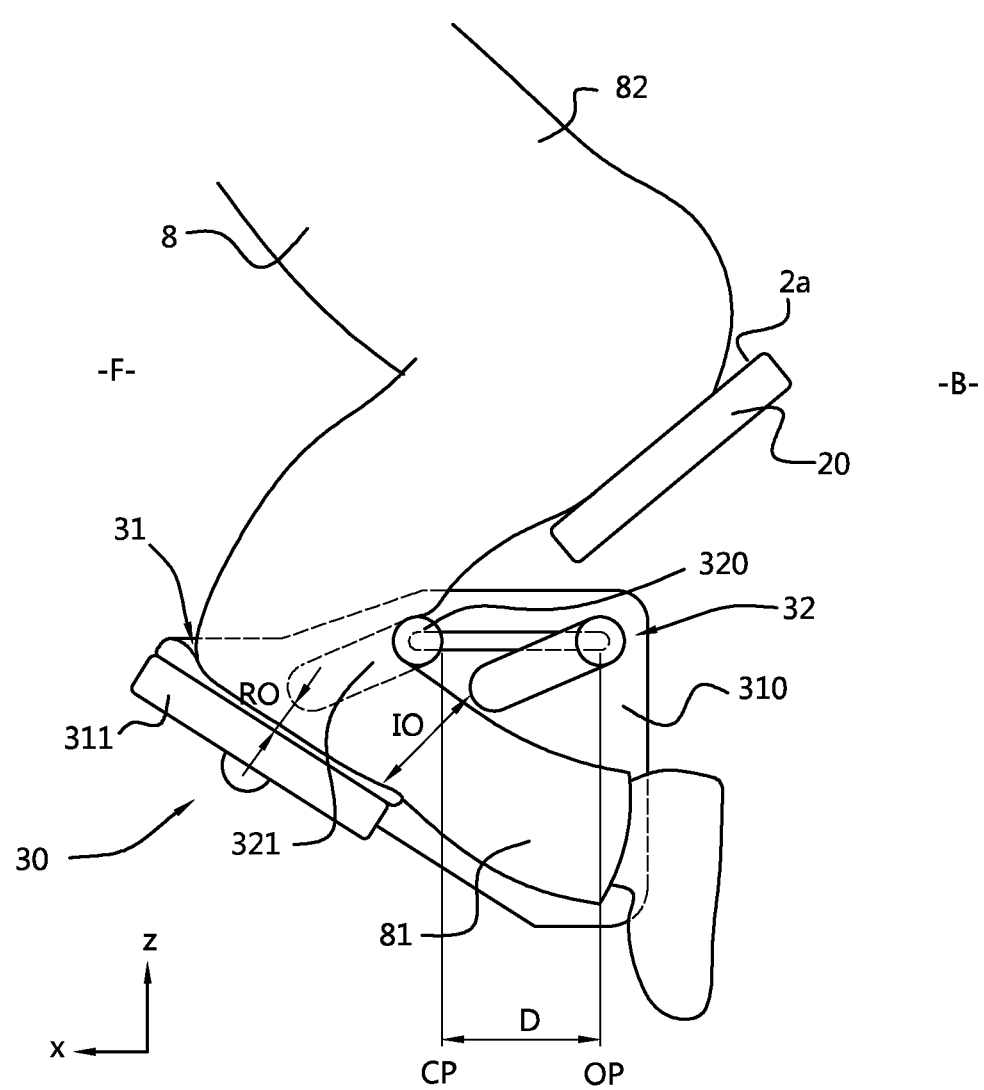

In FIG. 3, the amusement device seat assembly including the leg locking device is embodied as a motorbike. In FIG. 4 and FIG. 5, the amusement device seat assembly is embodied as a chair seat for a rollercoaster as for example depicted in FIG. 1.

In both illustrated embodiments, the leg locking device 30 is arranged to lock the lower legs of the person in the leg space LS which are situated below the seat base 20. The leg space LS includes a left and right subspace for respectively receiving a left and right lower leg of the person 8.

The leg space LS is subdivided by a central mount 31 to provide a subspace for a left leg and a subspace for a right leg. The central mount 31 is centrally positioned with respect to the seat base 20.

In FIG. 3-5, the lateral mount is a shin mount 311. The shin mount 311 is arranged to prevent a forward directed movement of the leg 81. Here, the leg 81 of the person 8, in particular a shin, is resting against the shin mount 311.

FIG. 3 schematically shows an embodiment of an amusement device seat assembly according to the invention. In FIG. 3, the seat assembly has a seat base 20 which is embodied as a saddle of a motorbike. The seat base 20 has a seating surface 2a which is inclined with respect to a horizontal reference. The seat assembly has a front side F and a back side B. A person 8 who takes a sit at the seating surface 2a will get oriented in a leaning forward F direction. Here, the person 8 will take a posture like a driver on a motorbike.

In FIG. 3, the person 8 has an upper body 82 which is free to move and not retained. Here, there is no upper body retainer 69. The seat assembly is provided with a leg locking device 30. The legs of the person are retained by the leg locking device 30. Each lower leg 81 of the person 8 is separately retained. The lower legs of the person are individually retained by the leg locking device, such that a forward and outwardly directed lateral movement of each lower leg is prevented.

As shown in FIG. 3, the bracket 32 is arranged to engage at a middle region of the lower leg 81 of the person who is sitting in the seat assembly. The bracket 32 engages at a kneebend or high calf region of the leg.

As shown in FIG. 3, the bracket 32 may be displaceable between two end positions. The bracket 32 may be lineary movable to and from the open OP and closed position CP over a lock distance D as illustrated in FIG. 3. To displace the bracket, the bracket 32 may be guided by a linear guide.

Here, in FIG. 3, the main bracket 320 is pin-shaped. The main bracket 320 provides an inner bracket surface to engage to the back side of a leg of a passenger. The pin-shaped main bracket 320 has a proximal end which is connected to the central mount 31 of the seat assembly and a distal end which extends in a lateral direction away from the central mount 31 of the seat assembly. The bracket 32 has an outer bracket extension 321 which is connected to the distal end of the main bracket 320. The outer bracket extension 321 has an oblong shape. A free end of the outer bracket extension 321 extends in a forward direction towards the shin mount 311.

FIGS. 4A and 4B shows the seat assembly 2 in an alternative embodiment according to the invention. Here, the seat assembly 2 is formed as a chair seat including a seat base 20 and a back support 2b. Additionally, the seat 2 comprises a headrest 2c and a lumbar support 2d like the seat assembly shown in FIG. 1.

FIG. 4B shows the seat assembly 2 of FIG. 4A, wherein a person 8 is sitting on the seat base 20. The seat assembly 2 comprises both an upper body retainer 69 and a leg locking device which are positioned in FIG. 4A in an open configuration and in FIG. 4B in a closed configuration.

In FIG. 4A, the bar construction 68 of the upper body retainer 69 is placed in an upper position to allow a person 8 to enter the seat assembly 2. A person 8 may take a sit at the seat base 20 and may manually bring the bar construction to a lower position to bring the upper body retainer 69 in the closed configuration as shown in FIG. 4B.

As shown in FIG. 4B, the bracket 32 engages to a lower region of the leg 81 of the person sitting in the seat assembly. The bracket 32 engages at a level of an ankle of the leg. Advantageously, such a low engagement helps a person to move the bracket 32 by pushing with his leg against the inner bracket extension 322.

As shown in FIG. 4A, the seat base 20 has a seating surface 2a with a slight inclination with respect to a horizontal reference. The inclination is upwards when seen from the front to the back side of the leg locking device 30. Advantageously, this slight inclination of for example at least 5° contributes to an intuitive working of the leg locking device 30. Particularly, the inclination of the seat surface 2a of the seat base is arranged in between at least 5° and at most 30°. Due to the slight inclination of the seating surface 2a, a person sitting in the seat assembly is oriented in a forward direction, which orientation will stimulate the person to bring his legs under is hips. Herewith, the person 8 is stimulate to bring his legs to the leg locking device 30.

Seen in a frontal view, the central mount of the 31 of the locking device 30 is centrally positioned with respect to the seat base 20. The central mount 31 has—seen from a top view—in a cross-section a T-shape. The central mount 31 is formed by the main mount 310 and the shin mount 311. The shin mount 311 is connected to the main mount 310. The main mount 310 extends in a vertical plane. Here, the main mount 310 has a linked bar structure, wherein an elongated beam extends in a downward direction away from the seat base 20. The main mount 310 prevents an inwardly directed lateral movement of a leg of a passenger. The shin mount 311 prevents a forwardly directed movement of a leg of a passenger.

FIGS. 5A and 5B further show the bracket 32 of the leg locking device 30. The bracket 32 is U-shaped. The bracket 32 has a main bracket 320 which forms a main body of the bracket 32. The main bracket 320 forms the base of the U-shape. The main bracket 320 has a proximal end which is directed to the central mount 31 and a distal end which is laterally directed away from the central mount 31. The outer bracket extension 321 is connected to the distal end of the main bracket 320. Further, the bracket 32 has an inner bracket extension 322 which is connected to the proximal end of the main bracket 320. The inner and outer bracket extension 321, 322 extend in a same direction. The inner and outer bracket extension 321, 322 form the U-legs of the U-shape. The bracket 32 has an outer bracket extension 321 which is shorter than the inner bracket extension 322. The inner and outer bracket extensions form a receiving opening for receiving a leg of a passenger. In FIG. 5A-5C, the bracket 32 with extensions 321, 322 is shown in further detail.

As shown in FIG. 5B and FIG. 5C, the bracket 32 is rotatable connected with respect to the central mount 31 to rotate to and fro an open and closed position. The central mount 31 has a lateral extension 319 which is positioned below the seat base 20. The lateral extension is spaced from the lateral mount. The bracket 32 is connected below the seat base 20 to the lateral extension 319 of the central mount 31. The bracket 32 is rotatable about a bracket pivot axis 329 which extends in a substantial vertical direction as is shown in further detail in FIG. 5A. The bracket pivot axis 329 is laterally spaced at a distance from the central mount 310. The bracket pivot axis 329 is positioned below the seat base 20.

In the open configuration of the leg locking device 30, the bracket 32 is rotated into the open position OP and the receiving opening of the bracket 32 is laterally outwardly directed for receiving a leg 81 of a person as is shown in FIG. 5A. In the closed configuration of the leg locking device 30, the bracket 32 is rotated into the closed position CP as is shown in FIG. 5C. The bracket 32 is rotated such that the receiving opening of the bracket 32 becomes positioned opposite the shin mount 311. The initial opening for introducing a lower leg into the receiving opening is reduced. In this orientation of the bracket 32 opposite the shin mount 311, the outer bracket extension 321 prevents an outwardly laterally directed movement of the leg 81 of the person.

The inner bracket extension 322 contributes to rotate the bracket 32 to the closed position CP. The bracket 32 is biased about the bracket pivot axis 329 to force the bracket into the open position OP. The rotatable connection of the bracket 32 to the seating assembly comprises a shaft and a spring, in particular a torsial spring, preferably a gas spring, to act a spring force to the bracket 32. A person sitting in the seat assembly may push his leg against the inner bracket extension 322 to rotate the bracket 32 from the open position OP to the closed position CP. The bracket 32 has a snap-member to snap the bracket 32 to the seat assembly, in particular to the underside of the seat base 20, when the bracket 32 is pushed into the closed position CP. Once a snap connection of the bracket 32 to the seat assembly is made, the bracket 32 is in movable and only after an intervention of an operator or a control unit, the leg locking device can be released.

FIG. 5A—5C show the leg locking device 30 of FIG. 4 in further detail. In FIG. 5A, the leg locking device 30 is shown in an open configuration. In FIG. 5B, the leg locking device 30 is shown in an intermediate configuration between the open and closed configuration, wherein a lower leg is received via the receiving opening into the bracket 32 of the locking device 30 and pressed against the inner bracket extension. In FIG. 5C, the leg locking device 30 is shown in the closed configuration, in which the lower leg is resting to the shin mount 311.

Here, the shin mount 311 is ergonomically shaped which contributes to a comfortable support of a leg of a passenger. The shin mount 311 has a shin mounting surface 313 which has a concave shape. The concave shape extends in a direction which corresponds with a legs length direction and a passenger takes a seat. The concave shape is adapted to a convex shape of a leg of a passenger. The shin mount 311 is rotatably connected to the main mount 310 about a shin mount axis 312. The shin mount axis 312 extends in a lateral outward direction. Seen in a frontal view of the seat assembly, the shin mount axis 312 extends in a transversal, substantially horizontal direction. Hence, the shin mount 311 is rotatable in a direction which corresponds with a rotational freedom of movement of the leg of the passenger. Advantageously, by rotating the shin mount 311 about the shin mount axis 312, the shin mount 311 can be aligned with a lower leg of the person sitting in the seat assembly 1 which increases a passengers comfort.

It is noted that the term "comprising" (and grammatical variations thereof) is used in this specification in the inclusive sense of "having" or "including", and not in the exclusive sense of "consisting only of".

Numerous variants are possible in addition to the embodiment shown in the figures. In a variant of the illustrated embodiment of the bracket of the leg locking device in which the bracket has a slim U-shape cross-section, the bracket may have a more bulky shape. Although the invention has been disclosed with reference to particular embodiments, from reading this description those of skilled in the art might appreciate a change or modification that may be possible from a technical point of view but which still do not depart from the scope of the invention as described above and claimed hereafter. Modifications may be made to adapt a particular situation or material within the teaching of the invention and without departing from the essential scope thereof. It will be understood by those of skilled in the art that various changes may be made and equivalents may be substituted for elements thereof without departing from the scope of the invention. Therefore, the invention is not limited to the particular embodiments disclosed and illustrated in the above detailed description, but that the invention will include all embodiments falling within the scope of the appended claims.

Thus, the invention provides an amusement device seat assembly comprising a seat to allow a passenger to sit during a ride with an amusement device. A leg space is provided under a seat base for holding a left and right leg of the passenger. The seat assembly comprises a leg locking device for retaining an in the leg space introduced lower leg of the passenger. The leg locking device comprises a central mount with a main mount. A lateral mount connected to the main mount prevents a forwardly directed movement of the lower leg. A bracket which may be operatable by the passenger himself is movable to provide an open or closed configuration of the leg locking device. In the closed configuration, an outer bracket extension prevents a laterally outwardly directed movement of a lower leg of a passenger. Advantageously, an intuitively working leg locking device is provided which contributes to a high level of operational reliability.

LEGEND

1 amusement device seat assembly
2 seat
20 seat base
2a seating surface
2b back support
2c head-rest
2d lumbar support
2e back support surface
30 leg locking device
31 central mount
310 main mount
311 lateral/shin mount
312 shin mount axis
313 shin mounting surface
319 lateral extension
32 bracket
320 main bracket
321 outer bracket extension
322 inner bracket extension
329 bracket pivot axis
60 suspended roller coaster
61 elongated track
62 seat assembly
63 frame
64 track engagement means
65 seat
66 pivot mechanism
67 pivot axis
68 bar construction
68a lap bar
68b pivot arms
69 upper body retainer
8 passenger/person
81 leg of person
82 upper body
IO initial opening
RO reduced opening
CP closed position
OP open position
D lock distance
F front-side
B back-side
LS leg space

The invention claimed is:

1. An amusement device seat assembly comprising:
a seat having a seat base providing a seating surface at an upper side to allow a passenger to sit on the seat, wherein the seat has a leg space under the seat base for holding a left and right lower leg of the passenger;
a leg locking device for locking a lower leg of the passenger introduced in the leg space, wherein the locking device has an open configuration to provide an initial opening for introducing the lower leg of the passenger into the leg space and a closed configuration for retaining the introduced lower leg, wherein the locking device comprises:
a central mount including:
a main mount centrally positioned under the seat base, wherein the main mount divides the leg space into a left and right leg subspace for respectively receiving a left and right lower leg of a passenger, said main mount extending downwardly away from the seat base; and
a lateral mount connected to the main mount, the lateral mount extending in a lateral outward direction away from the main mount to prevent a forward movement of a lower leg,
wherein the locking device further comprises a bracket for enclosing a leg of the passenger, wherein the bracket is arranged cooperatively with the lateral mount, wherein the bracket is movable relative to the lateral mount to and from an open position and a closed position to obtain respectively the open and closed configuration of the locking device,
wherein the bracket comprises:
a main bracket movably connected with respect to the main mount; and
an outer bracket extension connected to the main bracket and positioned at a lateral outside position of the bracket,
wherein, in the open position of the bracket, the outer bracket extension is spaced from the lateral mount to provide the initial opening to allow an introduction of the lower leg into the leg subspace, and
wherein, in the closed position, the outer bracket extension is placed closer to the lateral mount to reduce the initial opening and to enclose a lower leg introduced in the leg subspace to prevent a lateral outwardly directed movement of the lower leg.

2. The amusement device seat assembly according to claim 1, wherein the bracket further comprises an inner bracket extension connected to the main bracket at an end opposite said outer bracket extension, such that the bracket has a U-shape.

3. The amusement device seat assembly according to claim 2, wherein the lateral mount is fixed to the main mount.

4. The amusement device seat assembly according to claim 2, wherein the U-shape bracket forms a receiving opening adapted to a width of a lower leg of the passenger, the U-shaped bracket being outwardly biased by a spring to move the bracket from the closed position to the open position by a biasing force, such that the bracket is inwardly rotatable to the closed position by a counteracting pushing force acted by the passenger onto the inner bracket extension.

5. The amusement device seat assembly according to claim 4, wherein a snap-connection is provided to snap the bracket into the closed position.

6. The amusement device seat assembly according to claim 5, wherein the lateral mount is fixed to the main mount.

7. The amusement device seat assembly according to claim 4, wherein the lateral mount is fixed to the main mount.

8. The amusement device seat assembly according to claim 2, wherein the main bracket is rotatably connected about a bracket pivot axis, such that the bracket is rotatable from the open position to provide the initial opening to the closed position for retaining a lower leg.

9. The amusement device seat assembly according to claim 1, wherein the main bracket is rotatably connected about a bracket pivot axis, such that the bracket is rotatable from the open position to provide the initial opening to the closed position for retaining a lower leg.

10. The amusement device seat assembly according to claim 9, wherein the U-shape bracket forms a receiving opening adapted to a width of a lower leg of the passenger, the U-shaped bracket being outwardly biased by a spring to move the bracket from the closed position to the open position by a biasing force, such that the bracket is inwardly rotatable to the closed position by a counteracting pushing force acted by the passenger onto the inner bracket extension.

11. The amusement device seat assembly according to claim 9, wherein the lateral mount is fixed to the main mount.

12. The amusement device seat assembly according to claim 1, wherein the lateral mount is fixed to the main mount.

13. The amusement device seat assembly according to claim 1, wherein the lateral mount is arranged as a shin mount, the shin mount being movable connected to the main mount to enable an alignment of the shin mount with an in the leg space introduced lower leg.

14. The amusement device seat assembly according to claim 13, wherein the shin mount is rotatable connected to the main mount about a shin mount axis extending in a lateral outwardly direction away from the main mount.

15. An amusement device, comprising a suspended roller coaster, comprising the seat assembly as defined in claim 1.

16. A method for operating a leg locking device for retaining a person in an amusement device seat assembly, comprising:
using the amusement device seat assembly as defined in claim 1;
operating the leg locking device from an open to a closed configuration by closing the bracket being situated behind the lateral mount; and
operating the leg locking device from a closed configuration to an open configuration for releasing the introduced lower leg of a person.

17. The method according to claim 16, wherein the bracket is closed by a movement of a lower leg of the passenger, wherein the passenger pushes the bracket to the closed position.

18. The method according to claim 16, wherein a left and right bracket are only locked when both brackets are each moved to the closed position.

19. The method according to claim 16, wherein the amusement device seat assembly further comprises an upper body retainer, wherein operational steps of releasing the upper body retainer and the leg locking device are successively carried out, the leg locking device being operated from the closed configuration to the open configuration before performing a release operation of the upper body retainer.

20. A locking device for locking a lower leg of a passenger introduced in a leg space, wherein the locking device has an open configuration to provide an initial opening for introducing the lower leg of the passenger into the leg space and a closed configuration for retaining the introduced lower leg, the locking device comprises:
a central mount including:
a main mount, wherein the main mount divides the leg space into a left and right leg subspace for respectively receiving a left and right lower leg of a passenger; and
a lateral mount connected to the main mount, wherein the lateral mount extends in a lateral outward direction away from the main mount to prevent a forward movement of a lower leg,
wherein the locking device further comprises: comprises a bracket for enclosing the lower leg of the passenger, wherein the bracket is arranged cooperatively with the lateral mount, wherein the bracket is movable relative to the lateral mount to and fro an open and closed position to obtain respectively the open and closed configuration of the locking device,
wherein the bracket comprises:
a main bracket movably connected to the main mount; and
an outer bracket extension connected to the main bracket and positioned at a lateral outside position of the main bracket,
wherein in the open position of the bracket, the outer bracket extension is spaced from the lateral mount to provide an initial opening to allow an introduction of the lower leg into the leg subspace, and
wherein, in the closed position of the bracket, the outer bracket extension is positioned closer to the lateral mount to reduce the initial opening and to enclose the introduced lower leg to prevent a lateral outwardly directed movement of the leg.

\* \* \* \* \*